United States Patent [19]

White

[11] Patent Number: 6,041,286

[45] Date of Patent: *Mar. 21, 2000

[54] APPARATUS FOR AND METHOD OF ACCURATELY OBTAINING THE CYCLE TIME OF COMPLETION OF TRANSMISSION OF VIDEO FRAMES WITHIN AN ISOCHRONOUS STREAM OF DATA TRANSMITTED OVER AN IEEE 1394 SERIAL BUS NETWORK

[75] Inventor: Larry L. White, San Jose, Calif.

[73] Assignees: Sony Corporation, Tokyo, Japan; Sony Electronics, Inc., Park Ridge, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/957,965

[22] Filed: Oct. 21, 1997

[51] Int. Cl.[7] ....................................................... G06F 11/34
[52] U.S. Cl. ................................ 702/176; 702/79; 714/47
[58] Field of Search ............................... 364/130, 148.01, 364/188; 702/176, 79, 84; 395/287, 559, 739; 370/437, 438, 465, 475; 345/329; 714/47

[56] References Cited

U.S. PATENT DOCUMENTS

| | | |
|---|---|---|
| 4,225,922 | 9/1980 | Porter ....................................... 711/123 |
| 5,047,919 | 9/1991 | Sterling et al. ............................ 714/47 |
| 5,204,956 | 4/1993 | Danuser et al. ........................... 714/47 |
| 5,394,556 | 2/1995 | Oprescu . |
| 5,495,481 | 2/1996 | Duckwall ................................. 370/462 |
| 5,517,639 | 5/1996 | Yamaguchi .............................. 702/176 |
| 5,764,930 | 6/1998 | Staats ....................................... 395/287 |
| 5,793,366 | 8/1998 | Mano et al. ............................. 345/329 |
| 5,802,057 | 9/1998 | Duckwall et al. ....................... 370/408 |

*Primary Examiner*—Marc S. Hoff
*Assistant Examiner*—Bryan Bui
*Attorney, Agent, or Firm*—Haverstock & Owens LLP

[57] ABSTRACT

In order to accurately obtain the cycle time at which transmission of a video frame, within an isochronous video stream of data, is complete, a command is added at the end of the video frame. The added command causes the value of the cycle time register to be read and recorded when the transmission of a video frame is complete. Preferably, the added command is a load quad command which records the value of the cycle time register within the command structure. When the transmitting application then receives the interrupt, notifying it that transmission of the video frame is complete, the application obtains the previously recorded cycle time value from the load quad command structure. Preferably, the video frame is part of an isochronous stream of video data which is transmitted over an IEEE 1394 serial bus network. In this manner, the cycle time corresponding to the completion of each video frame within the stream of data is accurately obtained.

19 Claims, 5 Drawing Sheets

| CMD | Key | i |  | W |  | regCount |
|---|---|---|---|---|---|---|
| add ||||||||
| data 32 ||||||||
| xferstatus |||||||

Fig. 5

APPARATUS FOR AND METHOD OF ACCURATELY OBTAINING THE CYCLE TIME OF COMPLETION OF TRANSMISSION OF VIDEO FRAMES WITHIN AN ISOCHRONOUS STREAM OF DATA TRANSMITTED OVER AN IEEE 1394 SERIAL BUS NETWORK

FIELD OF THE INVENTION

The present invention relates to the field of transmitting information between devices. More particularly, the present invention relates to the field of transmitting time sensitive information between devices over an IEEE 1394 serial bus network.

BACKGROUND OF THE INVENTION

The IEEE 1394 standard, "P1394 Standard For A High Performance Serial Bus," Draft 8.0v2, Jul. 7, 1995, is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394 standard bus architecture provides multiple channels for isochronous data transfer between applications. A six bit channel number is broadcast with the data to ensure reception by the appropriate application. This allows multiple applications to concurrently transmit isochronous data across the bus structure. Asynchronous transfers are traditional data transfer operations which take place as soon as possible and transfer an amount of data from a source to a destination.

The IEEE 1394 standard provides a high-speed serial bus for interconnecting digital devices thereby providing a universal I/O connection. The IEEE 1394 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394 standard is very thin in size compared to other bulkier cables used to connect such devices. Devices can be added and removed from an IEEE 1394 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space.

The IEEE 1394 cable environment is a network of nodes connected by point-to-point links, including a port on each node's physical connection and the cable between them. The physical topology for the cable environment of an IEEE 1394 serial bus is a non-cyclic network of multiple ports, with finite branches. The primary restriction on the cable environment is that nodes must be connected together without forming any closed loops.

The IEEE 1394 cables connect ports together on different nodes. Each port includes terminators, transceivers and simple logic. A node can have multiple ports at its physical connection. The cable and ports act as bus repeaters between the nodes to simulate a single logical bus. The cable physical connection at each node includes one or more ports, arbitration logic, a resynchronizer and an encoder. Each of the ports provide the cable media interface into which the cable connector is connected. The arbitration logic provides access to the bus for the node. The resynchronizer takes received data-strobe encoded data bits and generates data bits synchronized to a local clock for use by the applications within the node. The encoder takes either data being transmitted by the node or data received by the resynchronizer, which is addressed to another node, and encodes it in data-strobe format for transmission across the IEEE 1394 serial bus. Using these components, the cable physical connection translates the physical point-to-point topology of the cable environment into a virtual broadcast bus, which is expected by higher layers of the system. This is accomplished by taking all data received on one port of the physical connection, resynchronizing the data to a local clock and repeating the data out of all of the other ports from the physical connection.

When transmitting isochronous video data between two devices, it is important for the transmitting device to know the cycle time at which the last byte of a video frame is transmitted. If this cycle time is not correct, distortion or jitter can be induced into the stream of video data, causing a degradation in the quality of the images ultimately displayed. Once a video frame is transmitted, an interrupt is sent, notifying the transmitting application that the video frame has been completely transferred. When this interrupt is received, the transmitting application then obtains the cycle time by reading the value from the cycle time register. The cycle time register maintains the current bus time for the node. There can be some delay between the time transmission of the video frame is complete and the time at which the interrupt is received and the cycle time is read from the cycle time register. This delay can induce unwanted distortion or jitter into the display of the video data.

What is needed is a method of and apparatus for accurately obtaining the cycle time at which the transmission of a video frame is complete. What is further needed is a method of and apparatus for reducing the amount of jitter and distortion induced into a transmitted stream of isochronous video data due to delays in obtaining the cycle time relative to the end of a video frame.

SUMMARY OF THE INVENTION

In order to accurately obtain the cycle time at which transmission of a video frame, within an isochronous video stream of data, is complete, a command is added at the end of the video frame. The added command causes the value of the cycle time register to be read and recorded when the transmission of a video frame is complete. Preferably, the added command is a load quad command which records the value of the cycle time register within the command structure. When the transmitting application then receives the interrupt, notifying it that transmission of the video frame is complete, the application obtains the previously recorded cycle time value from the load quad command structure. Preferably, the video frame is part of an isochronous stream of video data which is transmitted over an IEEE 1394 serial bus network. In this manner, the cycle time corresponding to the completion of each video frame within the stream of data is accurately obtained.

BRIEF DESCRIPTION OF THE DRAWINGS

FIG. 5 illustrates a structure of the load quad command used to obtain the cycle time value.

DETAILED DESCRIPTION OF THE PREFERRED EMBODIMENT

Figure 1:
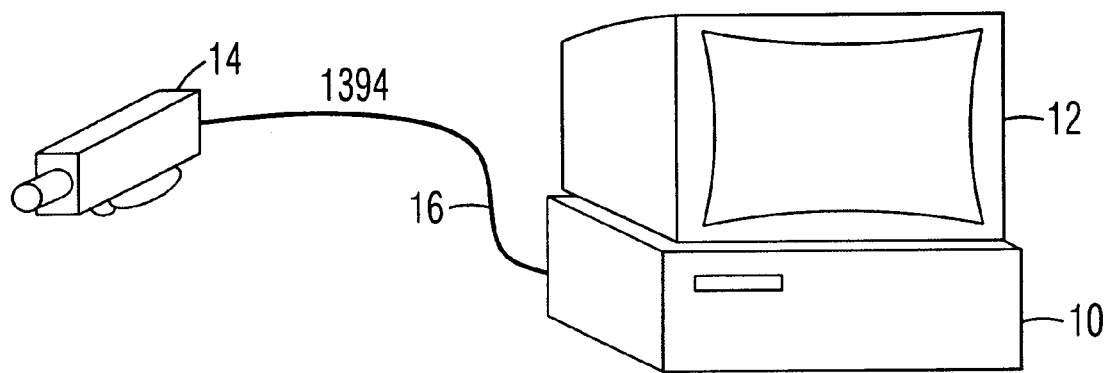
FIG. 1 illustrates a block diagram of an IEEE 1394 serial bus network including a computer system and a video camera.

A block diagram of an exemplary IEEE 1394 serial bus network including a computer system and a video camera is illustrated in FIG. 1. The computer system 10 includes an associated display 12 and is coupled to the video camera 14 by the IEEE 1394 serial bus cable 16. Video data and associated data are sent between the video camera 14 and the computer 10 over the IEEE 1394 serial bus cable 16.

Figure 2:
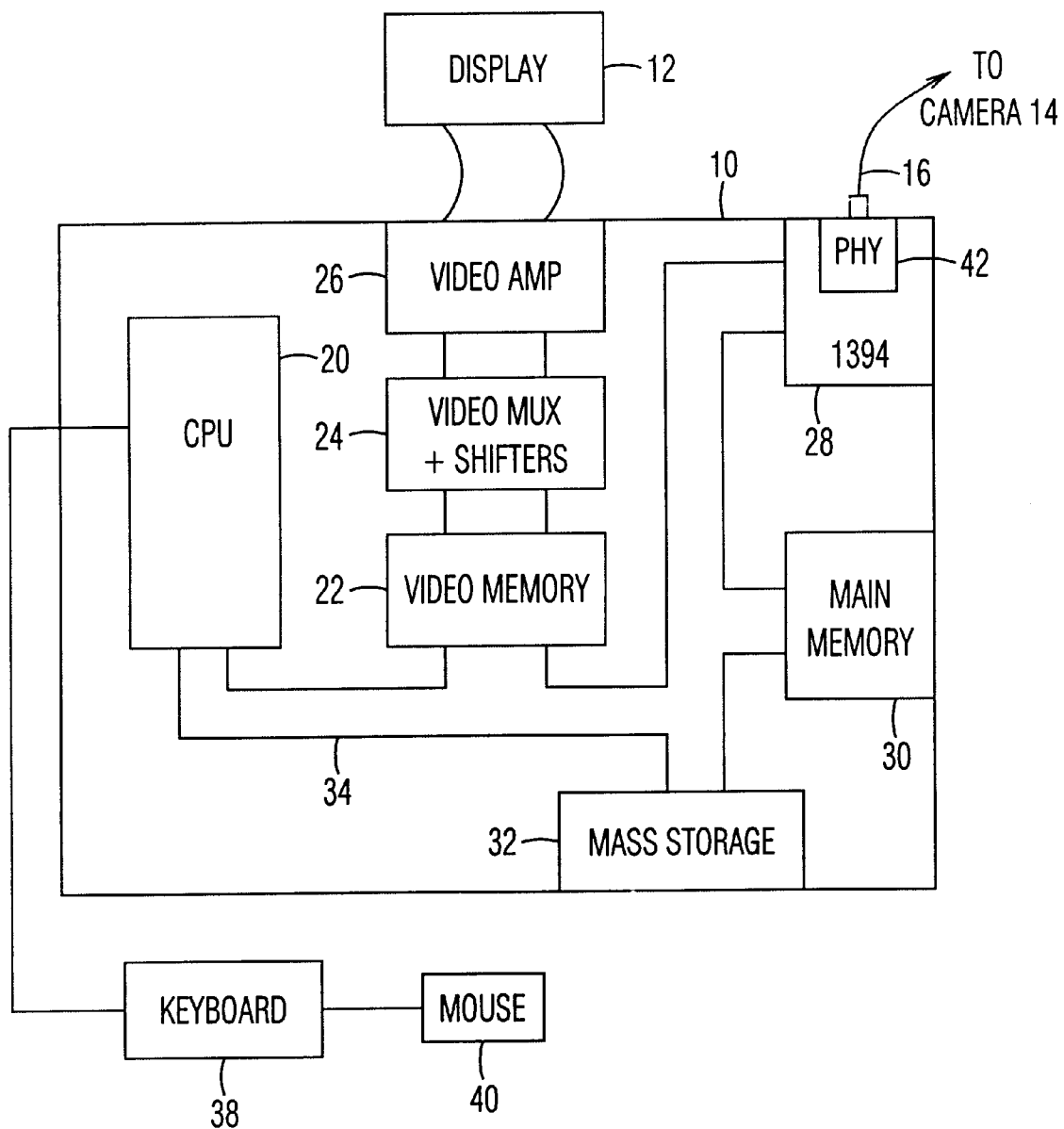
FIG. 2 illustrates a block diagram of the internal components of the computer system.

A block diagram of the internal components of the computer system 14 is illustrated in FIG. 2. The computer system 10 includes a central processor unit (CPU) 20, a main memory 30, a video memory 22, a mass storage device 32 and an IEEE 1394 interface circuit 28, all coupled together by a conventional bidirectional system bus 34. The interface circuit 28 includes the physical interface circuit 42 for sending and receiving communications on the IEEE 1394 serial bus. The physical interface circuit 42 is coupled to the camera 14 over the IEEE 1394 serial bus cable 16. In the preferred embodiment of the present invention, the interface circuit 28 is implemented on an IEEE 1394 interface card within the computer system 10. However, it should be apparent to those skilled in the art that the interface circuit 28 can be implemented within the computer system 10 in any other appropriate manner, including building the interface circuit onto the motherboard itself. The mass storage device 32 may include both fixed and removable media using any one or more of magnetic, optical or magneto-optical storage technology or any other available mass storage technology. The system bus 34 contains an address bus for addressing any portion of the memory 22 and 30. The system bus 34 also includes a data bus for transferring data between and among the CPU 20, the main memory 30, the video memory 22, the mass storage device 32 and the interface circuit 28.

The computer system 10 is also coupled to a number of peripheral input and output devices including the keyboard 38, the mouse 40 and the associated display 12. The keyboard 38 is coupled to the CPU 20 for allowing a user to input data and control commands into the computer system 10. A conventional mouse 40 is coupled to the keyboard 38 for manipulating graphic images on the display 12 as a cursor control device.

A port of the video memory 22 is coupled to a video multiplex and shifter circuit 24, which in turn is coupled to a video amplifier 26. The video amplifier 26 drives the display 12. The video multiplex and shifter circuitry 24 and the video amplifier 26 convert pixel data stored in the video memory 22 to raster signals suitable for use by the display 12.

Figure 3:
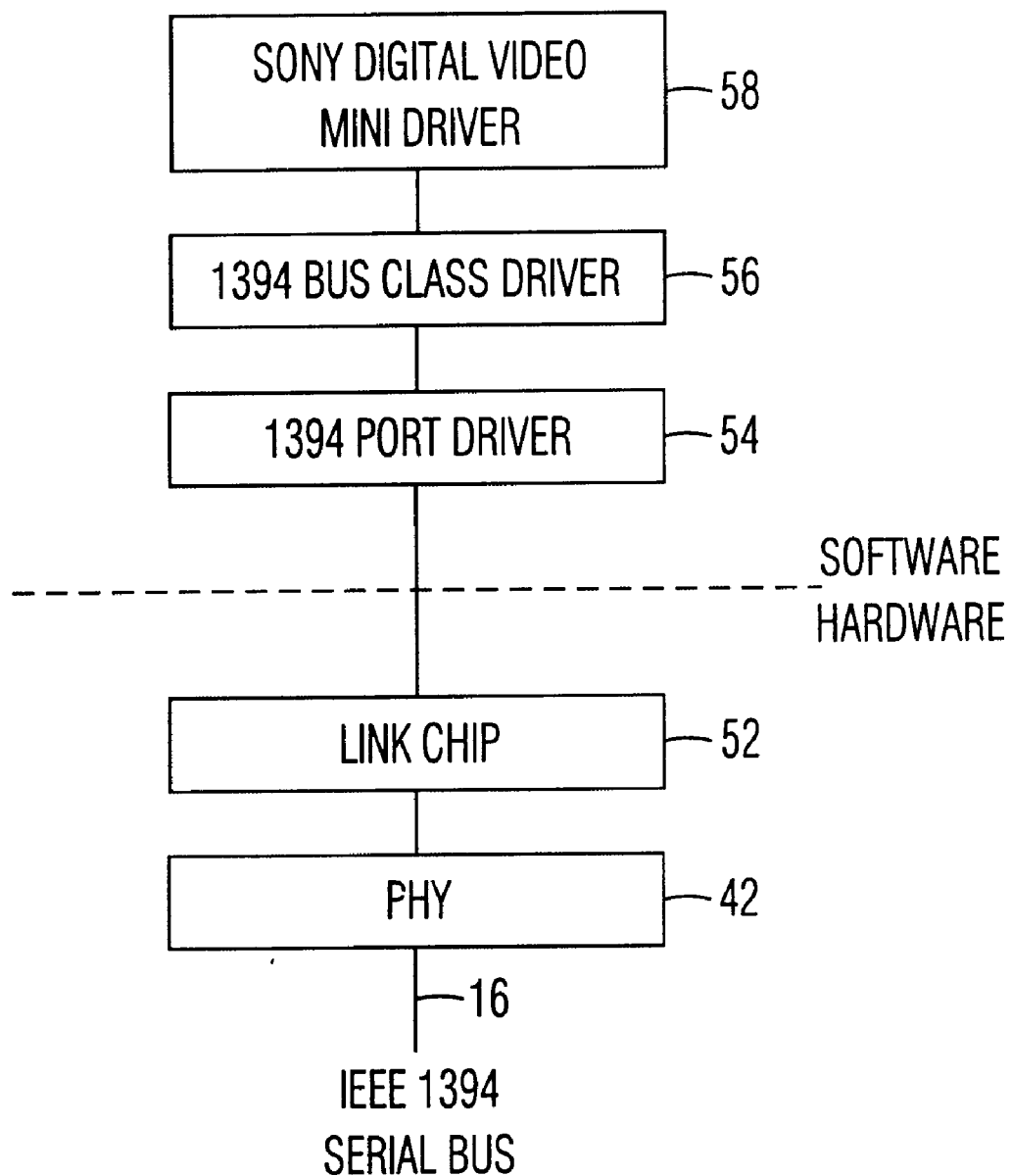
FIG. 3 illustrates a block diagram of the hardware and software architecture.

A block diagram of the hardware and software architecture of the components and drivers necessary for transmitting a video frame is illustrated in FIG. 3. As described above, the physical transceiver circuit 42 is coupled to the IEEE 1394 serial bus 16 and is responsible for transmitting and receiving communications from the computer 10 over the IEEE 1394 serial bus network. It should be apparent to those skilled in the art that the present invention can be implemented on any appropriately configured node used to transmit data packets. A link chip 52 is coupled to the physical transceiver circuit 42 for providing data and control signals from device drivers and applications to the physical transceiver circuit 42. The link chip 52 is included within the interface circuit 28. The software applications and device drivers communicate with the link chip 52. The relevant software applications and device drivers for transmitting data from the node over the IEEE 1394 serial bus network include the IEEE 1394 port driver 54, the IEEE 1394 bus class driver 56 and the digital video mini driver 58. The drivers 54, 56 and 58 reside within the operating system and provide the instructions and data necessary to transmit a video frame.

When transmitting a video frame, the frame is divided into a number of portions for transmission. Each portion of the frame is transmitted by executing an output command and transmitting the current portion of the frame within a cycle, over the IEEE 1394 serial bus from the physical transceiver circuit 42. After the last output command has been executed and the last portion of the video frame is transmitted, a load quad command is then executed and the current value of the cycle time register is read and stored within the load quad command structure. When the digital video mini driver 58 receives an interrupt signalling that the transmission of the video frame is complete, the digital video mini driver 58 reads the value from the load quad command structure for the video frame and thereby obtains an accurate value for the cycle time corresponding to the completion of the transmission of the video frame.

Figure 4:
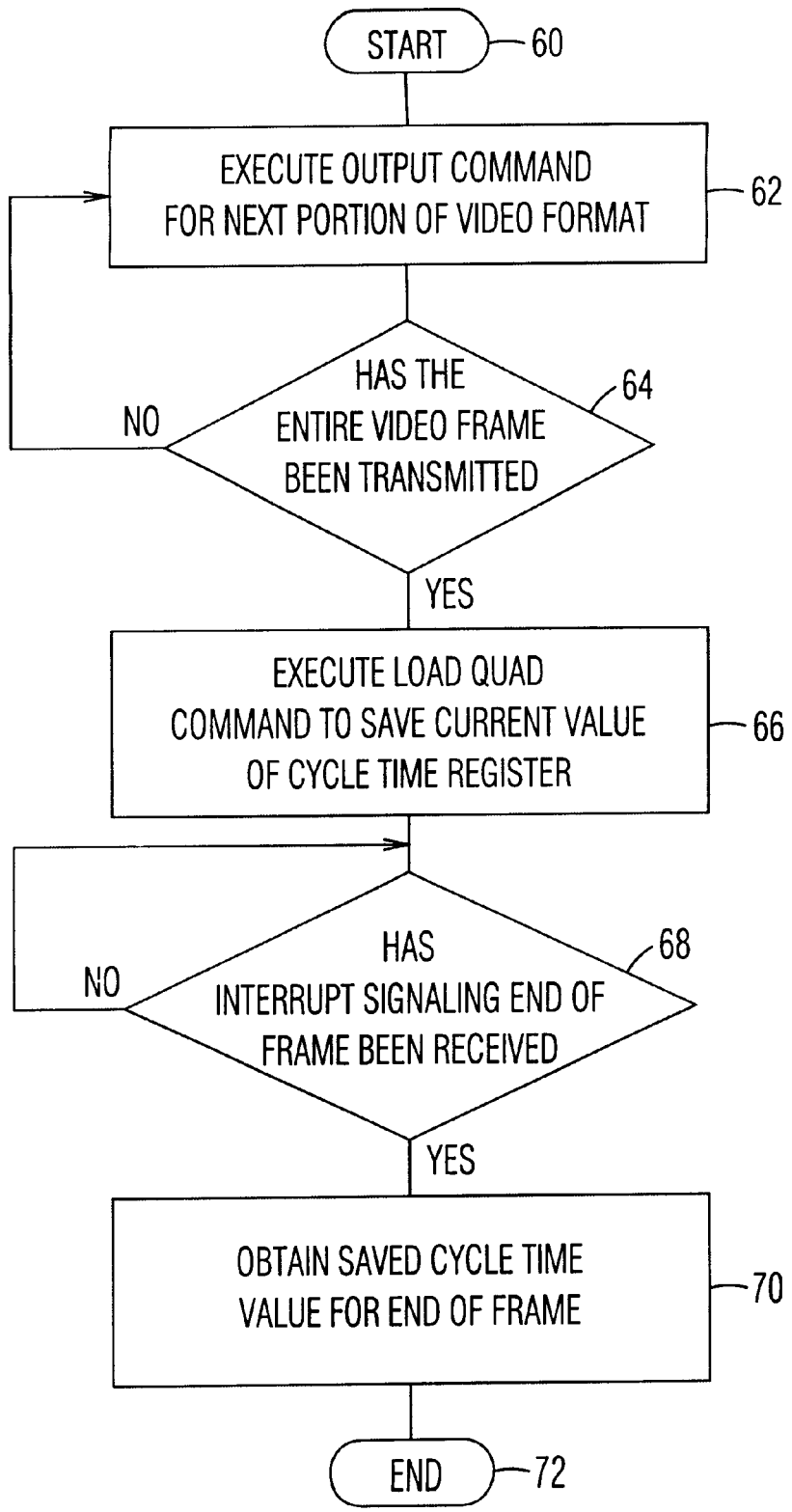
FIG. 4 illustrates a flow diagram of the steps involved in obtaining an accurate cycle time value corresponding to completion of transmission of a video frame.

A flow diagram of the steps involved in obtaining an accurate cycle time value corresponding to completion of transmission of a video frame according to the present invention, is illustrated in FIG. 4. The flow chart is entered at the step 60, when the digital video mini driver 58 is preparing to transmit a frame of video data over the IEEE 1394 serial bus network. At the step 62, the output command is executed in order to transmit the first portion of the video frame. To complete this output command, the current portion of the video frame is transmitted from the transceiver circuit 42, over the IEEE 1394 serial bus 16, to the receiving node. At the step 64, it is determined if the entire video frame has been transmitted. If the entire video frame has not been transmitted, then the steps 62 and 64 are repeated for each portion of the video frame, until the entire video frame has been transmitted.

Figure 5:
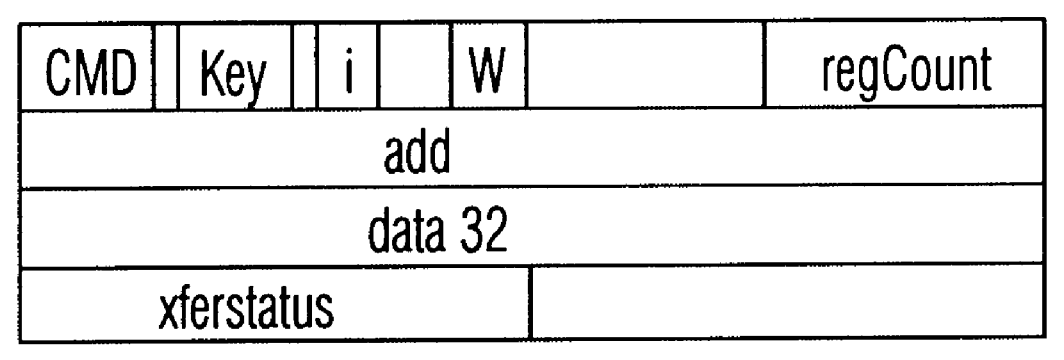

Once the entire video frame has been transmitted, the digital video mini driver 58 then executes a load quad command which reads the current value of the cycle time register and stores this value into the command structure, at the step 66. A structure of the load quad command used to obtain the current value of the cycle time register is illustrated in FIG. 5. Within the load quad command, the command field CMD is a four bit field which contains a value representing the type of command which is to be executed. For a load quad command, the command field CMD has a value equal to five. Within a load quad command, the key field key is a three bit field which is used to specify to which address space the immediate data is to be transferred. The interrupt field i is a two bit field which specifies under what conditions an interrupt should be generated once the command is generated. The values for the interrupt field i and the corresponding conditions are included below within Table 1.

TABLE 1

Interrupt Field i And Corresponding Conditions

| i | Condition |
|---|---|
| 0 | Never interrupt |
| 1 | Interrupt if the interrupt condition bit is true |
| 2 | Interrupt if the interrupt condition bit is false |
| 3 | Always Interrupt |

The interrupt condition bit is generated by the channel on which the data is being transmitted.

The wait field w is a two bit field which controls further command fetching, if necessary. The values for the wait field w and the corresponding conditions are included below within Table 2.

TABLE 2

Wait Field w And Corresponding Conditions

| w | Condition |
|---|---|
| 0 | Never wait |
| 1 | Wait if the wait condition bit is tue |
| 2 | Wait if the wait condition bit is false |
| 3 | Always wait |

The wait condition bit is generated by the channel interface.

The request count field reqCount is a sixteen bit field which specifies the number of bytes to be read and loaded into the command structure. Preferably, the only valid values for the request count field reqCount are one, two and four bytes. The address field add is a thirty-two bit field which specifies the source address from which the data is to be read. For the load quad command of the present invention, the address field add includes the address of the cycle time register. The data field data32 is a thirty-two bit field into which the cycle time value read from the cycle time register is stored. The transfer status field xferStatus is a sixteen bit field into which the current content of the channel's ChannelStatus register is written upon completion of the command. By executing this load quad command, as illustrated in FIG. 5, the current value of the cycle time register is stored into the data field data32 of this load quad command, after the video frame has been completely transmitted.

After the load quad command has been executed, the digital video mini driver 58 waits at the step 68 for an interrupt signalling that transmission of the video frame has been completed. Once the interrupt is received, the digital video mini driver 58 obtains the saved cycle time value corresponding to the end of the frame, from the load quad command structure, at the step 70. The operation for the transmission of this video frame is then complete at the step 72.

The process for obtaining an accurate cycle time value corresponding to the completion of the transmission of a video frame, of the present invention, is repeated for each video frame within the isochronous stream of data. By obtaining the value of the cycle time register at the end of the frame and storing it within the load quad command, the system of the present invention removes the potential for jitter associated with waiting until the interrupt signal is received and then obtaining the value of the cycle time register. Therefore, when the interrupt signal is received, signalling that the video frame has been transmitted, the digital video mini driver 58 will obtain the cycle time value corresponding to the end of the video frame from the load quad command structure.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

I claim:

1. A method of obtaining a time value corresponding to completion of transmission of a group of data comprising the steps of:

a. executing a command to obtain a time value corresponding to completion of transmission of the group of data;

b. recording the time value corresponding to completion of transmission of the group of data within a command structure of the command;

c. waiting for an interrupt signal signalling completion of transmission of the group of data; and d. obtaining the time value from the command structure when the interrupt signal is received.

2. The method as claimed in claim 1 further comprising the step of transmitting the group of data to a receiving node.

3. The method as claimed in claim 2 wherein the group of data is transmitted over an IEEE 1394 serial bus network.

4. The method as claimed in claim 3 wherein the time value represents a cycle time corresponding to a bus time of the IEEE 1394 serial bus.

5. The method as claimed in claim 1 wherein the command is a load quad command.

6. The method as claimed in claim 1 wherein the group of data represents a video frame.

7. An apparatus for transmitting a group of data comprising:

a. a transmitting circuit for transmitting the group of data to a receiving node; and b. a control application for obtaining a time value corresponding to completion of transmission of the group of data, wherein the time value is obtained by recording the time value upon completion of transmission of the group of data and then retrieving the time value when the control application receives confirmation that transmission of the group of data is complete.

8. The apparatus as claimed in claim 7 wherein the group of data represents a video frame.

9. The apparatus as claimed in claim 7 wherein the transmitting circuit is configured for coupling to an IEEE 1394 serial bus for transmitting the group of data over the IEEE 1394 serial bus to the receiving node.

10. The apparatus as claimed in claim 7 wherein the time value is obtained by executing a command when transmission of the group of data is complete and storing the time value within a command structure of the command.

11. The apparatus as claimed in claim 10 wherein the command is a load quad command.

12. The apparatus as claimed in claim 11 wherein the control application receives confirmation by an interrupt signal.

13. A method of obtaining a cycle time value corresponding to completion of transmission of a video frame over an IEEE 1394 serial bus comprising the steps of:

a. reading a value of a cycle time register after a last portion of the video frame is transmitted;

b. recording the value of the cycle time register thereby forming a recorded value;

c. waiting for an interrupt signal signalling a completion of transmission of the video frame; and d. obtaining the recorded value when the interrupt signal is received.

14. The method as claimed in claim 13 wherein the steps of reading and recording include the step of executing a command which reads the value of the cycle time register and records the value into a command structure of the command.

15. The method as claimed in claim 14 wherein the step of obtaining is completed by obtaining the recorded value from the command structure.

16. The method as claimed in claim 15 wherein the command is a load quad command.

17. A method of transmitting a video frame of data comprising the steps of:

a. transmitting the video frame;

b. executing a command to obtain a time value corresponding to completion of transmission of a last portion of the video frame;

c. recording the time value corresponding to completion of transmission of the last portion of the video frame within a command structure of the command;

d. waiting for an interrupt signal confirming completion of transmission of the last portion of the video frame; and e. obtaining the time value from the command structure when the interrupt signal is received.

18. The method as claimed in claim 17 wherein the command is a load quad command.

19. The method as claimed in claim 18 wherein the video frame is transmitted over an IEEE 1394 serial bus structure.

* * * * *

UNITED STATES PATENT AND TRADEMARK OFFICE
CERTIFICATE OF CORRECTION

PATENT NO. : 6,041,286

DATED : March 21, 2000

INVENTOR(S) : Larry L. White

It is certified that error appears in the above-identified patent and that said Letters Patent is hereby correct as shown below: On the title page: Item [56]

IN THE REFERENCES CITED [56]

The following U.S. Patent Documents need to be added:

| | | | |
|---|---|---|---|
| --4,530,088 | 7/1985 | Hamstra et al. | 370/110.1 |
| 4,713,702 | 12/1987 | Ishihara et al. | 360/79 |
| 4,979,185 | 12/1990 | Bryans et al. | 375/20 |
| 5,052,029 | 9/1991 | James et al. | 375/107 |
| 5,262,965 | 11/1993 | Putnam et al. | 395/101 |
| 5,400,340 | 3/1995 | Hillman et al. | 370/105.3 |
| 5,434,860 | 7/1995 | Riddle | 370/84 |
| 5,444,709 | 8/1995 | Riddle | 370/94.1 |
| 5,546,389 | 8/1996 | Wippenbeck et al. | 370/60 |
| 5,594,734 | 1/1997 | Worsley et al. | 370/395 |
| 5,596,581 | 1/1997 | Saeijs et al. | 370/394 |
| 5,598,415 | 1/1997 | Nuber et al. | 370/474 |
| 5,628,025 | 5/1997 | Chung et al. | 395/800 |
| 5,668,811 | 9/1997 | Worsley et al. | 370/424 |
| 5,689,244 | 11/1997 | Iijima et al. | 340/825.07 |
| 5,710,773 | 1/1998 | Shiga | 370/512 |
| 5,736,944 | 4/1998 | Kurihara | 341/50 |
| 5,781,599 | 7/1998 | Shiga | 375/376--. |

UNITED STATES PATENT AND TRADEMARK OFFICE
CERTIFICATE OF CORRECTION

PATENT NO. :    6,041,286

DATED      :    March 21, 2000

INVENTOR(S) :   Larry L. White

It is certified that error appears in the above-identified patent and that said Letters Patent is hereby correct as shown below:

The following Other Publications need to be added:

--"1394 200 Mb/s PHYsical Layer Transceiver," IBM Microelectronics, Product Data Sheet And Application Notes, Version 1.4, March 14, 1996.
"A Bus On A Diet - The Serial Bus Alternative, An Introduction To The P1394 High Performance Serial Bus," Michael Teener, CompCon 92, February 24-28, 1992, pp. 316-321.
"IEEE 1394-1995 Triple Cable Transceiver/Arbiter," Texas Instruments TSB21LV03, Product Review, Revision 0.99, March 19, 1996.
"P1394 Standard For A High Performance Serial Bus," IEEE, 1995.
"The IEEE-1394 High Speed Serial Bus," R.H.J. Bloks, Philips Journal Of Research, Vol. 50, No. 1/2 pp. 209-216, 1996.
"The SerialSoft IEEE 1394 Developer Toolkit," Skipstone--.

Signed and Sealed this

Thirteenth Day of March, 2001

Attest:

NICHOLAS P. GODICI

*Attesting Officer*    *Acting Director of the United States Patent and Trademark Office*